(12) United States Patent
Jiang et al.

(10) Patent No.: US 8,553,591 B2
(45) Date of Patent: Oct. 8, 2013

(54) METHOD AND EQUIPMENT FOR USER'S UPLINK DATA SCHEDULING

(75) Inventors: Dajie Jiang, Beijing (CN); Zhenping Hu, Beijing (CN); Chunfeng Cui, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 172 days.

(21) Appl. No.: 13/132,676

(22) PCT Filed: Dec. 4, 2009

(86) PCT No.: PCT/CN2009/001377
§ 371 (c)(1),
(2), (4) Date: Aug. 12, 2011

(87) PCT Pub. No.: WO2010/063166
PCT Pub. Date: Jun. 10, 2010

(65) Prior Publication Data
US 2011/0310777 A1    Dec. 22, 2011

(30) Foreign Application Priority Data
Dec. 4, 2008 (CN) .......................... 2008 1 0239018

(51) Int. Cl.
*H04J 3/00* (2006.01)
*H04L 12/28* (2006.01)

(52) U.S. Cl.
USPC ............................ 370/280; 370/345; 370/458

(58) Field of Classification Search
None
See application file for complete search history.

(56) References Cited

U.S. PATENT DOCUMENTS

| | | | |
|---|---|---|---|
| 2008/0056422 A1* | 3/2008 | Rao et al. | 375/357 |
| 2008/0117891 A1* | 5/2008 | Damnjanovic et al. | 370/345 |
| 2010/0182939 A1* | 7/2010 | Ojala et al. | 370/280 |

FOREIGN PATENT DOCUMENTS

| | | |
|---|---|---|
| CN | 101193444 | 6/2008 |
| CN | 101272177 | 9/2008 |
| CN | 101299821 | 11/2008 |
| WO | WO2008/127015 | 10/2008 |

OTHER PUBLICATIONS

International Search Report issued for PCT/CN2009/001377, dated Mar. 18, 2010, 2 pages.

* cited by examiner

*Primary Examiner* — Kevin C Harper
*Assistant Examiner* — Samina Choudhry
(74) *Attorney, Agent, or Firm* — Fulbright & Jaworski LLP

(57) ABSTRACT

A user uplink data scheduling method and user equipment, which are applied to multiple-periodicity mode semi-persistent scheduling supporting Transmission Timing Interval (TTI) bundling in the second Downlink/Uplink (DL/UL) timing interval proportion configuration mode (Time Division Duplex (TDD) DL/UL subframe configuration 1) in a Third Generation Partnership Project (3GPP) Long Term Evolution (LTE) TDD system. The user uplink data scheduling method includes the steps of: acquiring an indication message transmitted from a base station for indicating user uplink data based on the multiple-periodicity mode semi-persistent scheduling; setting a periodicity offset of the multiple-periodicity mode semi-persistent scheduling; determining the periodicities of the multiple-periodicity mode semi-persistent scheduling of per two adjacent TTI bundles according to the set offset; scheduling user uplink new transmission packet data according to the determined periodicities of the multiple-periodicity mode semi-persistent scheduling. The problem that the new-transmission packet and the re-transmission packet of the same user of the multiple-periodicity semi-persistent scheduling conflict is solved, and signal overhead is reduced when TTI bundling supports the VoIP service and so on.

3 Claims, 5 Drawing Sheets

METHOD AND EQUIPMENT FOR USER'S UPLINK DATA SCHEDULING

CROSS-REFERENCE TO RELATED APPLICATIONS

The present application is a U.S. National Stage of International Application No. PCT/CN2009/001377, filed Dec. 4, 2009, designating the United States and claiming priority to Chinese Patent Application No. 200810239018.1 filed Dec. 4, 2008, the disclosures of which are incorporated herein by reference.

The present invention relates to the field of mobile communications and particularly to a method for scheduling uplink data of a user and a user equipment applicable to 3 GPP LTE TDD DL/UL Subframe Configuration 1 to support TTI bundling.

Semi-persistent scheduling (SPS) is a new scheduling method proposed in 3 G long term evolution (LTE) to save physical downlink control channel (PDCCH), and was proposed primarily for a voice over IP (VoIP) service. a general idea of SPS lies in that a newly transmitted packet of the VoIP service arrives at an interval of 20 ms, so a periodicity of reserved resources may be indicated through radio resource control (RRC) signaling, then reserved resources in the time and frequency domains may be activated over a PDCCH, and subsequently data may be transmitted automatically over resources at a fixed location at the interval of 20 ms without indicating the allocated resources for each newly transmitted packet over the PDCCH; and that resources to be occupied for a retransmitted packet can not be reserved but have to be scheduled dynamically due to unpredictability of the retransmitted packet. in view of this, it is referred to as semi-persistent scheduling as illustrated in FIG. 1.

In an LTE Time Division Duplex (TDD) system, there are seven proportional configurations of uplink and downlink subframes, respectively Configurations 0 to 6, for five of which Round Trip Time (RTT) of a Hybrid Automatic Repeat reQuest (HARQ) corresponding to uplink transmission is 10 ms. Since the uplink of TD-LTE (i.e., TDD LTE) is based upon a synchronous HARQ and a retransmitted packet occurs after elapsing of 10 ms from a newly transmitted packet (i.e., an initially transmitted packet), the occurrence time for the retransmitted packet transmitted for the second time may conflict with an occurrence time allocated by current semi-persistent scheduling for a newly transmitted packet. As illustrated in FIGS. 2, 1, 2 and 3 in FIG. 2 represent serial numbers of uplink synchronous HARQ processes respectively (a newly transmitted packet and its retransmitted packet correspond to the same serial number of an HARQ process), and as can be apparent, if both of the uplink HARQ processes 1 and 2 are used to transmit data of the same UE, time conflict may arise between a retransmitted packet of the uplink HARQ process 1 and a newly transmitted packet of the uplink HARQ process 2 after elapsing of 20 ms since a newly transmitted packet of the uplink HARQ process 1 is transmitted.

In order to address the problem of time conflict between a retransmitted packet and a newly transmitted packet in the TD-LTE semi-persistent scheduling, a solution referred to as semi-persistent scheduling in a multi-periodicity mode has been proposed. A semi-persistent scheduling periodicity (i.e., an interval for resource allocation) applicable to a VoIP service is typically 20 ms, while there are two periodicities for the semi-persistent scheduling in the multi-periodicity mode, i.e., T1 and T2, where T1+T2=40 ms and T1 and T2 are active alternately. The relationship between T1 and T2 may be as follows.

$$T1 = \text{SPS periodicity} + \text{delta} \quad (1)$$

$$T2 = \text{SPS periodicity} - \text{delta} \quad (2)$$

Where the SPS periodicity represents a periodicity of the semi-persistent scheduling, which is 20 ms for the VoIP service, and the delta represents an offset of the periodicity of the semi-persistent scheduling.

As proposed in an existing solution, the value of delta in Equations (1) and (2) may be specified dependent upon a configuration of TD-LTE uplink and downlink subframes and a location of an uplink subframe at the beginning of semi-persistent scheduling in a TDD periodicity, that is, the value of delta may be determined uniquely when the semi-persistent scheduling starts with a specific uplink subframe, and RRC signaling is not necessary for notifying a User Equipment (UE) of the value of delta to be used, while 1-bit RRC signaling is necessary for indicating whether to use the semi-persistent scheduling in the multi-periodicity mode. For example, in the case of TDD Configuration 2, there are two uplink subframes in a TDD periodicity of 10 ms, and according to this solution, the value of delta is calculated in the following equation.

For semi-persistent scheduling starting with the first uplink subframe in the 10 ms frame, $$\text{Delta} = 5 \text{ ms} \quad (3)$$

For semi-persistent scheduling starting with the second uplink subframe in the 10 ms frame, $$\text{Delta} = -5 \text{ ms} \quad (4)$$

Or vice versa.

FIG. 3 illustrates a schematic diagram of semi-persistent scheduling in the multi-periodicity mode, and 1, 2, 3 and 4 in FIG. 3 represent serial numbers of uplink synchronous HARQ processes of the same UE respectively. As can be apparent, no resource confliction arises between a packet retransmitted for the second time of the process 1 and a newly transmitted packet of the process 2 and between a packet retransmitted for the second time and a newly transmitted packet of other processes.

Transmission Time Interval (TTI) bundling is a method for improving coverage of an uplink system cell on the principle that multiple redundancy versions resulted from encoding the same information bits are transmitted in multiple consecutive uplink TTIs. As illustrated in FIG. 4, for the second proportional configuration of uplink and downlink subframes in a 3GPP Long Term Evolution Time Division Duplex system (TDD DL/UL Subframe Configuration 1), each 5 ms LTE half-frame includes five 1 ms subframes, two of which are uplink subframes, and every four uplink subframes constitute a TTI bundle corresponding to an HARQ process 1 or 2. Thus, there are four TTI bundles in 40 ms, respectively TTI bundles A, B, C and D. If both the TTI bundling and the semi-persistent scheduling are used, for two adjacent resources for two newly transmitted packets (at an interval of 20 ms) allocated by the semi-persistent scheduling, e.g., the TTI bundles A and C, if there is an error for a newly transmitted packet over the TTI bundle A, an occurrence time of a corresponding retransmitted packet upon synchronous HARQ is the same as a time of the TTI bundle C, while the TTI bundle C is the pre-allocated resource for a next newly transmitted packet, therefore confliction may arise between the retransmitted packet and the newly transmitted packet of the same user.

At present, it is highly desired in the prior art to address the technical problem of how to obviate confliction between a retransmitted packet and a newly transmitted packet when both the semi-persistent scheduling and the TTI bundling are used for the TDD DL/UL Subframe Configuration 1.

SUMMARY OF THE INVENTION

In view of the problem of confliction between a retransmitted packet and a newly transmitted packet when both the semi-persistent scheduling and the TTI bundling are used for TDD DL/UL Subframe Configuration 1 in the prior art, a first object of the invention is to provide a method for scheduling uplink data of a user to address the problem of confliction between a retransmitted packet and a newly transmitted packet of the same user during the semi-persistent scheduling in the prior art.

In view of the problem of confliction between a retransmitted packet and a newly transmitted packet when both the semi-persistent scheduling and the TTI bundling are used for TDD DL/UL Subframe Configuration 1 in the prior art, a second object of the invention is to provide a system for scheduling uplink data of a user to address the problem of confliction between a retransmitted packet and a newly transmitted packet of the same user during the semi-persistent scheduling in the prior art.

To attain the first object, the invention provides a method for scheduling uplink data of a user, which includes: obtaining an indication message transmitted from a base station to indicate to schedule uplink data of the user based on the semi-persistent scheduling in the multi-periodicity mode; setting a value of periodicity offset of the semi-persistent scheduling in the multi-periodicity mode; determining periodicities of the semi-persistent scheduling in the multi-periodicity mode for every two adjacent TTI bundles according to the set value of periodicity offset; and scheduling uplink newly transmitted packet data of the user according to the determined periodicities of the semi-persistent scheduling in the multi-periodicity mode.

The value of periodicity offset of the semi-persistent scheduling in the multi-periodicity mode is set according to a system frame number of a system frame where a first TTI bundle allocated by the semi-persistent scheduling is located; or the value of periodicity offset of the semi-persistent scheduling in the multi-periodicity mode is set according to a system frame number of a system frame where a $N^{th}$ uplink subframe in a first TTI bundle allocated by the semi-persistent scheduling is located, where N is a natural number larger than 0 but not exceeding the number of uplink subframes included in a TTI bundle. The value of periodicity offset of the semi-persistent scheduling in the multi-periodicity mode is set as 10 ms when the system frame number is odd; and the value of periodicity offset of the semi-persistent scheduling in the multi-periodicity mode is set as −10 ms when the system frame number is even. Alternatively, the value of periodicity offset of the semi-persistent scheduling in the multi-periodicity mode is set as −10 ms when the system frame number is odd; and the value of periodicity offset of the semi-persistent scheduling in the multi-periodicity mode is set as 10 ms when the system frame number is even.

To attain the second object, the invention provides a user equipment including: an obtaining module configured to obtain an indication message transmitted from a base station to indicate to schedule uplink data of the user based on the semi-persistent scheduling in the multi-periodicity mode; a periodicity offset setting module configured to set a value of periodicity offset of the semi-persistent scheduling in the multi-periodicity mode after the obtaining module obtains the indication message; a periodicity setting module configured to determine periodicities of the semi-persistent scheduling in the multi-periodicity mode for every two adjacent TTI bundles according to the value of periodicity offset set by the periodicity offset setting module; and a scheduling module configured to schedule uplink newly transmitted packet of the user according to the periodicities of the semi-persistent scheduling in the multi-periodicity mode determined by the periodicity setting module.

The periodicity offset setting module includes: a frame number extraction sub-module configured to extract a system frame number of a system frame where a first TTI bundle allocated by the semi-persistent scheduling is located or a system frame number of a system frame where a $N^{th}$ subframe of a first TTI bundle allocated by the semi-persistent scheduling is located, wherein N is a natural number larger than 0 but not exceeding the number of uplink subframes included in a TTI bundle; and a setting sub-module configured to set the value of periodicity offset of the semi-persistent scheduling in the multi-periodicity mode according to the system frame number extracted by the frame number extraction sub-module.

The setting sub-module sets the value of periodicity offset of the semi-persistent scheduling in the multi-periodicity mode as 10 ms when the system frame number extracted by the frame number extraction sub-module is odd and sets the value of periodicity offset of the semi-persistent scheduling in the multi-periodicity mode as −10 ms when the system frame number extracted by the frame number extraction sub-module is even. Alternatively, the setting sub-module sets the value of periodicity offset of the semi-persistent scheduling in the multi-periodicity mode as −10 ms when the system frame number extracted by the frame number extraction sub-module is odd and sets the value of periodicity offset of the semi-persistent scheduling in the multi-periodicity mode as 10 ms when the system frame number extracted by the frame number extraction sub-module is even.

The method for scheduling uplink data of a user and the user equipment according to the invention address the problem of confliction between a retransmitted packet and a newly transmitted packet of the same user during semi-persistent scheduling in the multi-periodicity mode and reduce an overhead of signaling for a VoIP service supported by the TTI bundling by setting differently the periodicities T1 and T2 of semi-persistent scheduling in the multi-periodicity mode for every two adjacent TTI bundles allocated by the semi-persistent scheduling.

DETAILED DESCRIPTION OF THE EMBODIMENTS

The invention will be detailed hereinafter with reference to the drawings.

Figure 1:
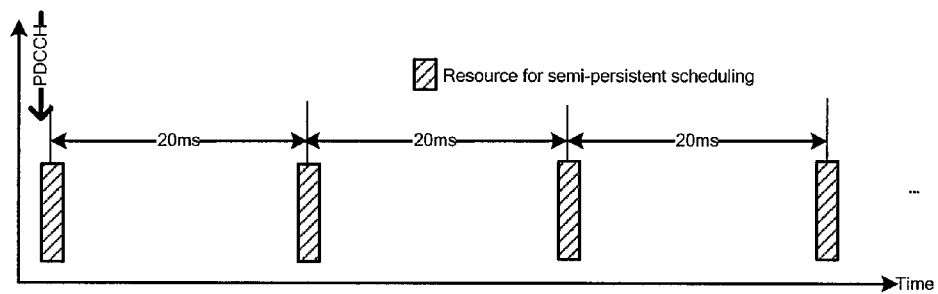
FIG. 1 illustrates a schematic diagram of semi-persistent scheduling in the prior art.
Figure 2:
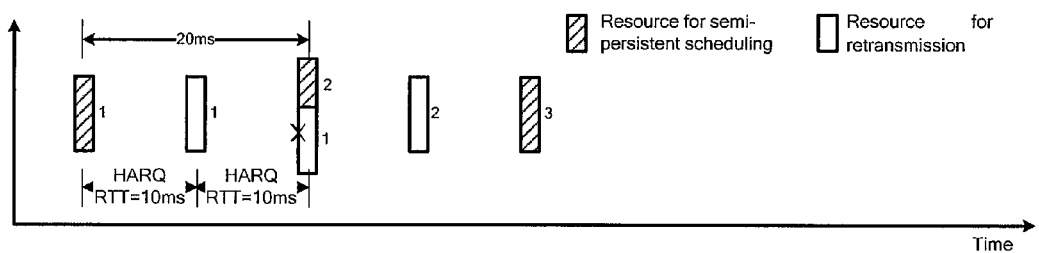
FIG. 2 illustrates a schematic diagram of resource confliction between a retransmitted packet and a newly transmitted packet during TD-LTE semi-persistent scheduling in the prior art.
Figure 3:
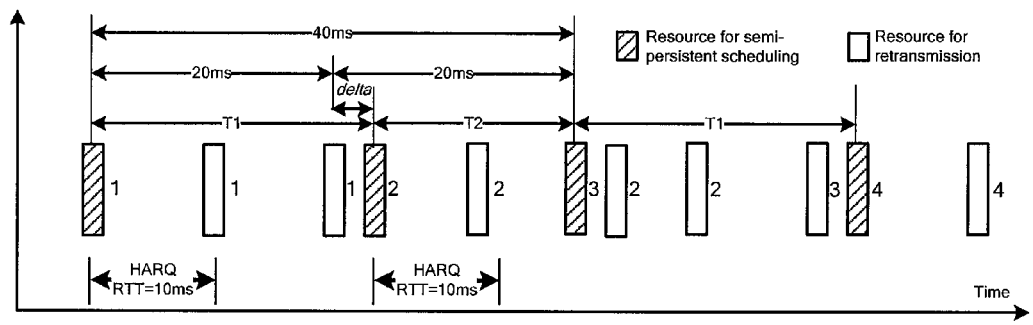
FIG. 3 illustrates a schematic diagram of semi-persistent scheduling in a multi-periodicity mode in the prior art.
Figure 4:
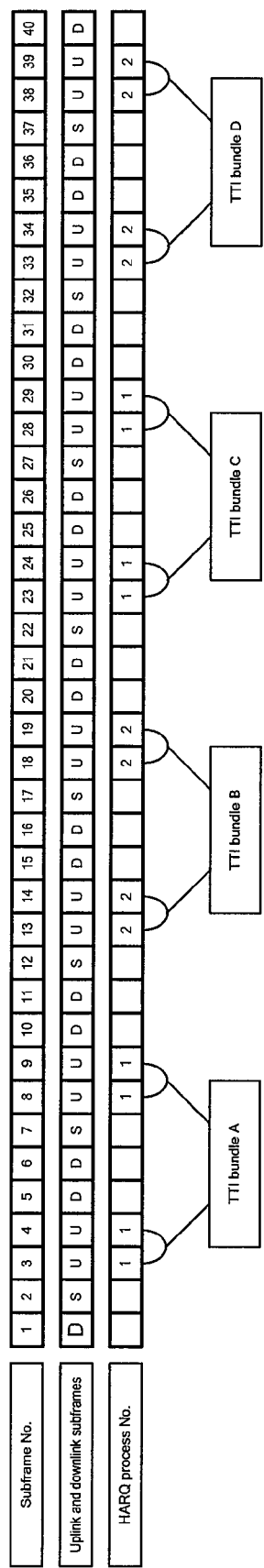
FIG. 4 illustrates a schematic diagram of semi-persistent scheduling supporting TTI bundling for TDD DL/UL Subframe Configuration 1 in the prior art.
Figure 5:
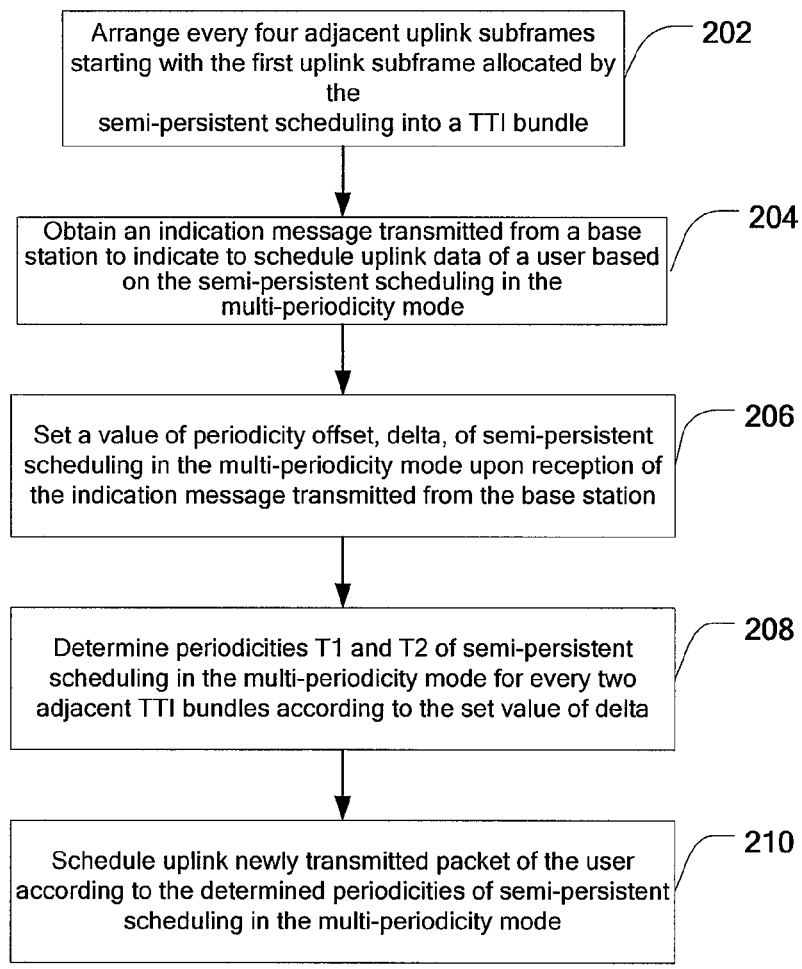
FIG. 5 illustrates a flow chart of a method for scheduling uplink data of a user according to an embodiment of the invention.

As illustrated in FIG. 5, a method for scheduling uplink data of a user according to an embodiment of the invention, applicable to semi-persistent scheduling in a multi-periodicity mode supporting TTI bundling for the second proportional configuration of uplink and downlink subframes in a 3GPP Long Term Evolution Time Division Duplex system (TDD DL/UL Subframe Configuration 1), includes the following operations 202-210.

The operation 202 is to arrange every M adjacent uplink subframes starting with the first uplink subframe allocated by the semi-persistent scheduling into a TTI bundle, where M is a natural number larger than 1.

The operation 204 is to obtain an indication message transmitted from a base station to indicate to schedule uplink data of a user based on the semi-persistent scheduling in the multi-periodicity mode.

The operation 206 is to set a value of periodicity offset, delta, of semi-persistent scheduling in the multi-periodicity mode upon reception of the indication message transmitted from the base station.

The operation 208 is to determine periodicities T1 and T2 of semi-persistent scheduling in the multi-periodicity mode for every two adjacent TTI bundles according to the set value of delta.

The operation 210 is to schedule uplink newly transmitted packet of the user according to the determined periodicities T1 and T2 of semi-persistent scheduling in the multi-periodicity mode.

When both the semi-persistent scheduling and the TTI bundling are used, if the base station determines a user equipment schedules uplink data based on semi-persistent scheduling in the multi-periodicity mode, the base station transmits the indication message to the user equipment to indicate to schedule the uplink data of the user based on the semi-persistent scheduling in the multi-periodicity mode.

Figure 6:
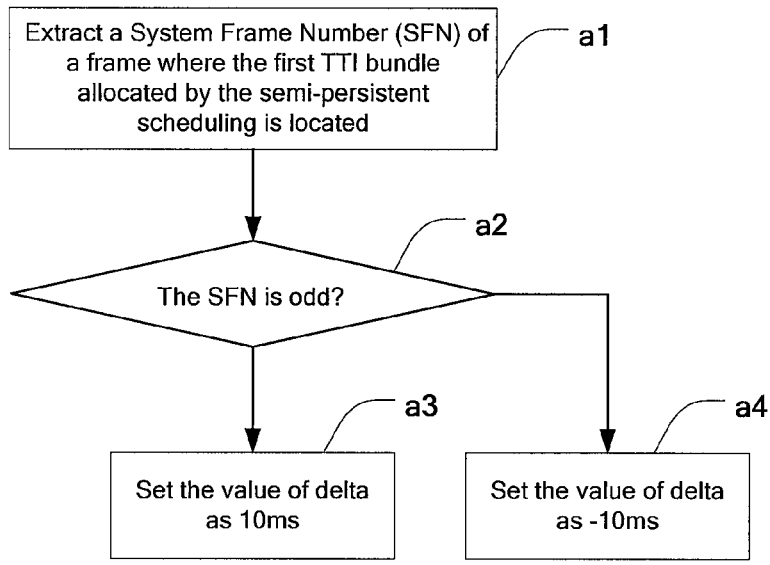
FIG. 6 illustrates a flow chart of Operation 206 in the method for scheduling uplink data of the user according to an embodiment of the invention.

As illustrated in FIG. 6, a method for setting the value of delta in the operation 206 includes the following operations.

The operation a1 is to extract a System Frame Number (SFN) of a system frame where the first TTI bundle allocated by the semi-persistent scheduling is located.

The operation a2 is to determine whether the SFN is odd or even.

The operation a3 is to set the value of delta as 10 ms when the SFN is odd.

The operation a4 is to set the value of delta as −10 ms when the SFN is even.

Alternatively, the operation a3' is to set the value of delta as −10 ms when the SFN is odd.

Alternatively, the operation a4' is to set the value of delta as 10 ms when the SFN is even.

Figure 7:
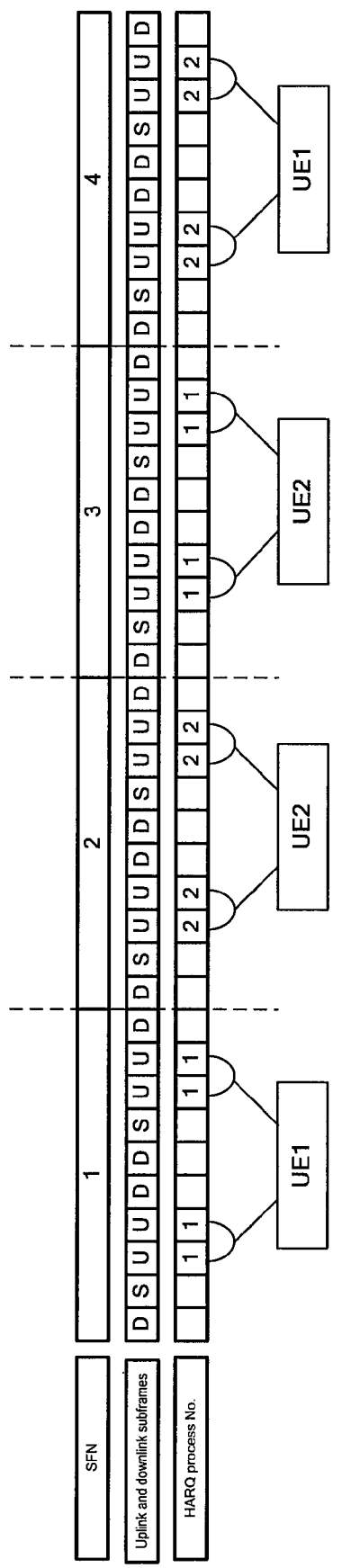
FIG. 7 illustrates a schematic diagram of semi-persistent scheduling in a multi-periodicity mode supporting TTI bundling for TDD DL/UL Subframe Configuration 1 according to an embodiment of the invention.

As illustrated in FIG. 7, the SFN of the system frame where the first TTI bundle allocated by the semi-persistent scheduling of a UE1 is located is odd, then the first two adjacent resources in 40 ms of multi-periodicity scheduling of the UE1 are located at an interval of 20 ms+10 ms=30 ms, that is, Delta=10 ms. And the SFN of the system frame where the first TTI bundle allocated by the semi-persistent scheduling of a UE2 is located is even, then the first two adjacent resources in 40 ms of multi-periodicity scheduling of the UE2 are located at an interval of 20 ms−10 ms=10 ms, that is, Delta=−10 ms.

Figure 8:
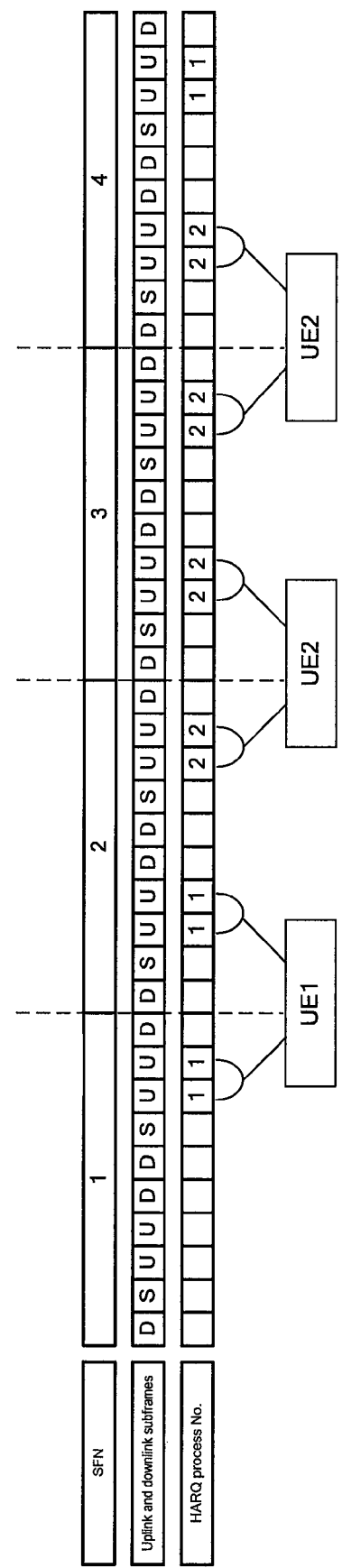
FIG. 8 illustrates another schematic diagram of semi-persistent scheduling in a multi-periodicity mode supporting TTI bundling for TDD DL/UL Subframe Configuration 1 according to an embodiment of the invention.

As illustrated in FIG. 8, the SFNs of the system frames where the uplink subframes of the first TTI bundle allocated by the semi-persistent scheduling of the UE1 are located may be different, then the System Frame Number (SFN) of the system frame where the $N^{th}$ uplink subframe of the first TTI bundle allocated by the semi-persistent scheduling is located may be extracted, where N is a natural number larger than 0 but not exceeding the number of uplink subframes included in a TTI bundle, and then a value of periodicity offset, delta, of the semi-persistent scheduling in the multi-periodicity mode may be set according to the extracted SFN. For example, the first TTI bundle includes four uplink subframes, where the SFN of the system frame where the first two uplink subframes are located is 1 and the SFN of the system frame where the last two uplink subframes are located is 2. Therefore, a value of periodicity offset, delta, of the semi-persistent scheduling in the multi-periodicity mode is set according to whether the SFN of the system frame where the first uplink subframe of the first TTI bundle is located is odd or even. Of course, the value of delta may alternatively set according to whether the SFN of the system frame where the $2^{nd}$, $3^{rd}$ or $4^{th}$ uplink subframe of the first TTI bundle is located is odd or even. And also the value of delta for other users shall be set according to whether the SFN of the system frame where an uplink subframe at the same location in the first TTI bundle allocated by the semi-persistent scheduling is located is odd or even.

Figure 9:
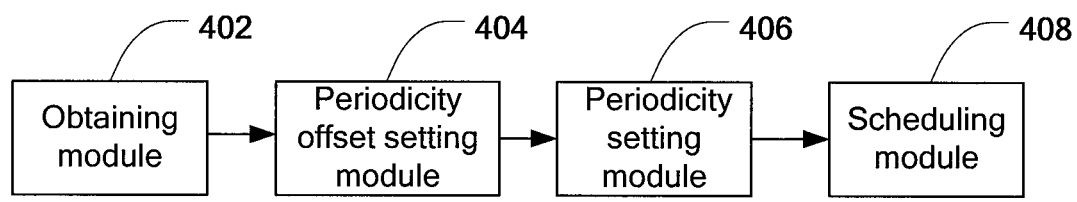
FIG. 9 illustrates a schematic structural diagram of a user equipment according to an embodiment of the invention.

As illustrated in FIG. 9, an embodiment of the invention provides a user equipment, applicable to semi-persistent scheduling in the multi-periodicity mode supporting TTI bundling for 3GPP Long Term Evolution TDD DL/UL Subframe Configuration 1, which includes an obtaining module 402, a periodicity offset setting module 404, a periodicity setting module 406 and a scheduling module 408.

The obtaining module 402 is configured to obtain an indication message transmitted from a base station to indicate to schedule uplink data of a user based on the semi-persistent scheduling in the multi-periodicity mode.

The periodicity offset setting module 404 is configured to set a value of periodicity offset, delta, of the semi-persistent scheduling in the multi-periodicity mode after the obtaining module 402 obtains the indication message.

The periodicity setting module 406 is configured to determine periodicities T1 and T2 of the semi-persistent scheduling in the multi-periodicity mode for every two adjacent TTI bundles according to the value of delta set by the periodicity offset setting module 404.

The scheduling module 408 is configured to schedule uplink newly transmitted packet of the user according to the periodicities T1 and T2 of the semi-persistent scheduling in the multi-periodicity mode determined by the periodicity setting module 406.

Figure 10:
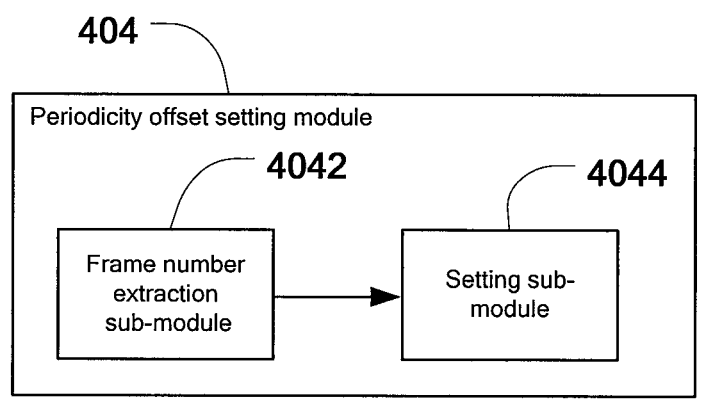
FIG. 10 illustrates a schematic structural diagram of a periodicity offset setting module in the user equipment according to an embodiment of the invention.

As illustrated in FIG. 10, the periodicity offset setting module 404 includes a frame number extraction sub-module 4042 and a setting sub-module 4044.

The frame number extraction sub-module 4042 is configured to extract a System Frame Number (SFN) of a system frame where the first TTI bundle allocated by the semi-persistent scheduling is located, or to extract a SFN of a system frame where the $N^{th}$ uplink subframe of the first TTI bundle allocated by the semi-persistent scheduling is located when SFNs of four uplink subframes of the first TTI bundle are different, where N is a natural number larger than 0 but not exceeding the number of uplink subframes included in a TTI bundle.

The setting sub-module 4044 is configured to set the value of periodicity offset of the semi-persistent scheduling in the multi-periodicity mode according to the SFN extracted by the frame number extraction sub-module 4042, where the value of delta is set as 10 ms when the SFN extracted by the frame number extraction sub-module 4042 is odd and the value of delta is set as −10 ms when the SFN extracted by the frame number extraction sub-module 4042 is even, or the value of delta is set as −10 ms when the SFN extracted by the frame number extraction sub-module 4042 is odd and the value of delta is set as 10 ms when the SFN extracted by the frame number extraction sub-module 4042 is even.

The periodicity setting module 406 sets the two periodicities in the first 40 ms of semi-persistent scheduling in the multi-periodicity mode respectively as T1=20+10=30 ms and T2=20−10=10 ms, or T1=20−10=10 ms and T2=20+10=30 ms, and T1+T2=40 ms. Resources allocated by semi-persistent scheduling in every succeeding 40 ms are relatively offset in time as in the first 40 ms. Hereby a newly transmitted VoIP packet is transmitted.

The method for scheduling uplink data of a user and the user equipment according to the invention address the problem of confliction between a retransmitted packet and a newly transmitted packet of the same user during semi-persistent scheduling in the multi-periodicity mode and reduce an overhead of signaling for a VoIP service supported by the TTI bundling by setting differently the periodicities T1 and T2 of semi-persistent scheduling in the multi-periodicity mode for every two adjacent TTI bundles allocated by the semi-persistent scheduling.

The foregoing description is presented only taking a VoIP service as an example, but the invention will not be limited to the VoIP service, and an uplink newly transmitted packet of a user with another service type may also be scheduled with the foregoing solution.

It will be appreciated that one skilled in the art may make various modifications and alterations to the present invention without departing from the scope of the present invention. Accordingly, if these modifications and alterations to the present invention fall within the scope of the claims of the present invention and their equivalents, the present invention intends to include all these modifications and alterations.

The invention claimed is:

1. A method for scheduling uplink data of a user, applicable to semi-persistent scheduling in a multi-periodicity mode supporting TTI bundling for a second proportional configuration of uplink and downlink subframes in a 3GPP Long Term Evolution Time Division Duplex system, TDD DL/UL Subframe Configuration 1, comprising:
    obtaining an indication message transmitted from a base station to indicate to schedule uplink data of the user based on the semi-persistent scheduling in the multi-periodicity mode;
    setting a value of periodicity offset of the semi-persistent scheduling in the multi-periodicity mode;
    determining periodicities of the semi-persistent scheduling in the multi-periodicity mode for every two adjacent TTI bundles according to the set value of periodicity offset; and
    scheduling uplink newly transmitted packet of the user according to the determined periodicities of the semi-persistent scheduling in the multi-periodicity mode,
    wherein setting a value of periodicity offset of the semi-persistent scheduling in the multi-periodicity mode comprises:
    setting the value of periodicity offset of the semi-persistent scheduling in the multi-periodicity mode according to a system frame number of a system frame where a first TTI bundle allocated by the semi-persistent scheduling is located; or
    setting the value of periodicity offset of the semi-persistent scheduling in the multi-periodicity mode according to a system frame number of a system frame where a $N^{th}$ uplink subframe in a first TTI bundle allocated by the semi-persistent scheduling is located, wherein N is a natural number larger than 0 but not exceeding the number of uplink subframes comprised in a TTI bundle,
    and wherein the value of periodicity offset of the semi-persistent scheduling in the multi-periodicity mode is set as 10ms or −10ms when the system frame number is odd; and
    the value of periodicity offset of the semi-persistent scheduling in the multi-periodicity mode is set as −10ms or 10ms when the system frame number is even.

2. The method for scheduling uplink data of a user of claim 1, wherein the system frame is a 10ms radio frame.

3. A user equipment, applicable to semi-persistent scheduling in a multi-periodicity mode supporting TTI bundling for 3GPP Long Term Evolution TDD DL/UL Subframe Configuration 1, comprising:
    an obtaining module configured to obtain an indication message transmitted from a base station to indicate to schedule uplink data of the user based on the semi-persistent scheduling in the multi-periodicity mode;
    a periodicity offset setting module configured to set a value of periodicity offset of the semi-persistent scheduling in the multi-periodicity mode after the obtaining module obtains the indication message;
    a periodicity setting module configured to determine periodicities of the semi-persistent scheduling in the multi-periodicity mode for every two adjacent TTI bundles according to the value of periodicity offset set by the periodicity offset setting module; and
    a scheduling module configured to schedule uplink newly transmitted packet of the user according to the periodicities of the semi-persistent scheduling in the multi-periodicity mode determined by the periodicity setting module,
    wherein the periodicity offset setting module comprises:
    a frame number extraction sub-module configured to extract a system frame number of a system frame where a first TTI bundle allocated by the semi-persistent scheduling is located or a system frame number of a system frame where a $N^{th}$ subframe of a first TTI bundle allocated by the semi-persistent scheduling is located, wherein N is a natural number larger than 0 but not exceeding the number of uplink subframes comprised in a TTI bundle; and
    a setting sub-module configured to set the value of periodicity offset of the semi-persistent scheduling in the multi-periodicity mode according to the system frame number extracted by the frame number extraction sub-module, and wherein the setting sub-module sets the value of periodicity offset of the semi-persistent scheduling in the multi-periodicity mode as 10ms or −10ms when the system frame number extracted by the frame number extraction sub-module is odd and sets the value of periodicity offset of the semi-persistent scheduling in the multi-periodicity mode as −10ms or 10ms when the system frame number extracted by the frame number extraction sub-module is even.

* * * * *